June 10, 1958     A. V. COLEMAN     2,838,331
STEERING IDLER ARM REPAIR KIT
Filed July 21, 1954     2 Sheets-Sheet 1
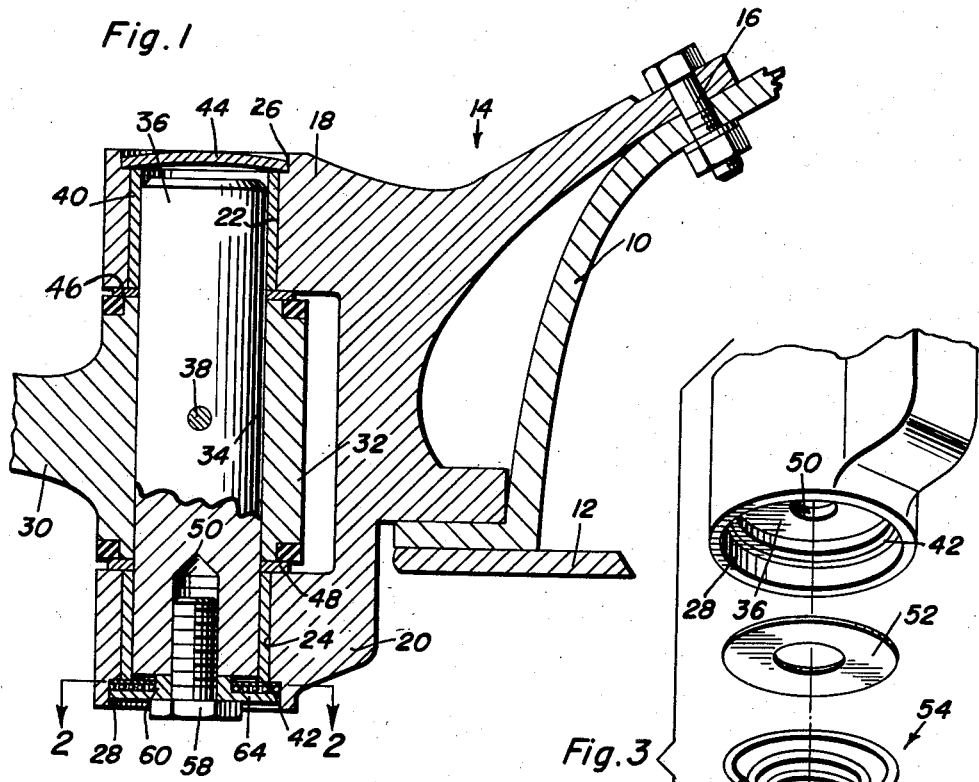
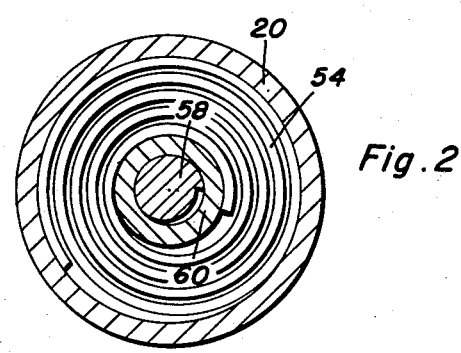
Archie V. Coleman
INVENTOR.

June 10, 1958
A. V. COLEMAN
2,838,331
STEERING IDLER ARM REPAIR KIT
Filed July 21, 1954
2 Sheets-Sheet 2
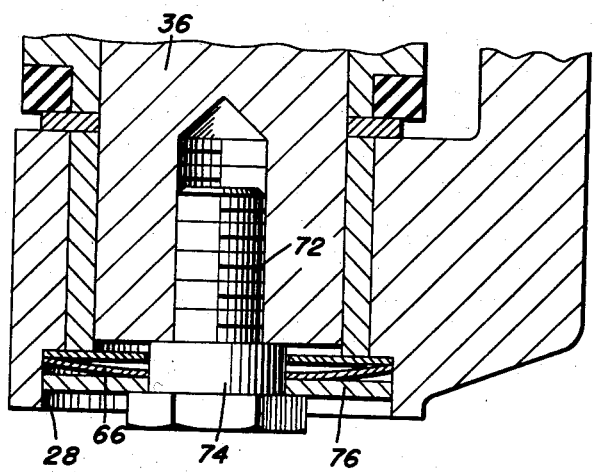
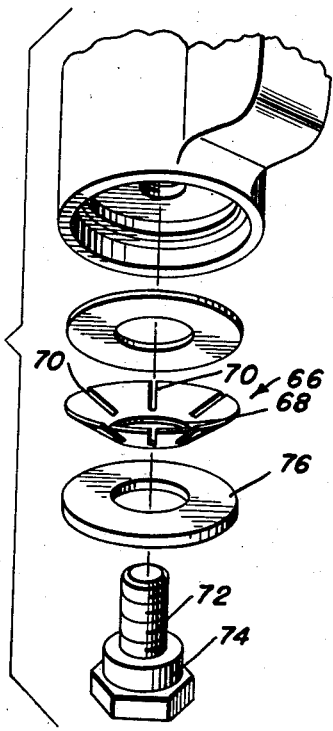
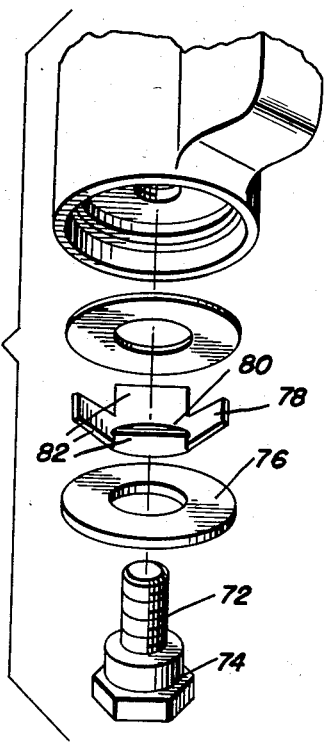
Archie V. Coleman
INVENTOR.

United States Patent Office 2,838,331
Patented June 10, 1958

2,838,331

STEERING IDLER ARM REPAIR KIT

Archie V. Coleman, Corpus Christi, Tex.

Application July 21, 1954, Serial No. 444,889

12 Claims. (Cl. 287—100)

This invention pertains to a repair unit for use in conjunction with the idler or center steering arm of Chevrolet automobiles, and has for its primary object the provision of a repair kit or unit which provides means for automatically adjusting end play between a steering idler arm and its mounting bracket when the unit is installed.

Chevrolet automobiles from 1949 through and including present models utilize a steering idler arm which is mounted upon a substantially vertical pivot pin at a point on the front cross-frame member midway between opposite side rails of the frame and to which a conventional drag link member is attached, the drag link being also attached to a conventional pitman arm member forming a part of the steering sector assembly for the automobile. Left and right tie rods are pivotally attached to the idler arm and extend to corresponding front wheels to impart the desirable and necessary steering geometry to these wheels as the steering wheel of the automobile is manipulated during normal driving operations. This particular arrangement of steering linkage is, of course, provided to reduce steering link interference which is attendant upon development of independent front suspension systems utilizing unequal length arms as is conventionally in practice in domestic cars. However, although the linkage arrangement offers a more precise and accurate steering geometry, a common fault encountered in Chevrolet automobiles of the years above specified results from end play which rapidly and easily develops between the bracket and idler arm which not only permits unpleasant rattling or noise to develop, but also renders steering of the vehicle difficult due to the misalignment in the linkage system causing improper tracking of the tires and undue wear on the same which cannot be corrected by maintaining the caster, camber, toe-in and king pin inclination within the manufacturer's recommended specification.

This invention contemplates the provision of a repair kit for replacing the manufacturer's component parts which form the connection between the idler arm and mounting bracket and which includes mechanism which not only decreases the rapidity with which end play may develop, but also imparts a uniform radial tension between the idler arm pivot pin and the idler arm mounting bracket which tends to prevent undue bushing wear and misalignment of the linkage system due to this effect.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a sectional view through the idler arm and mounting bracket assembly showing the invention in use;

Figure 2 is an enlarged horizontal section taken substantialy along the plane of section line 2—2 in Figure 1;

Figure 3 is an exploded perspective view of the invention;

Figure 4 is an enlarged sectional view showing a modified form of the invention;

Figure 5 is an exploded perspective view showing one form of the modification shown in Figure 4; and Figure 6 is another exploded perspective showing a further form of the modification shown in Figure 4.

Referring now more particularly to Figures 1-3, it is to be understood that the reference numerals 10 and 12, respectively, indicate portions of the upper and lower elements which are rigidly interconnected to provide a hollow construction forming the front cross-frame member of the vehicle and it is to be further understood that the reference numeral 14 indicates generally the conventional steering idler arm mounting bracket which is rigidly connected to the front cross-frame member by the mounting bolt 16 and other fastening elements not shown to provide a rigid interconnection therebetween. Although the mounting bracket construction is entirely conventional and forms no part of this invention, for the purpose of description, it is to be noted that the mounting bracket is provided with upper and lower knuckle portions 18 and 20 which are provided with vertically aligned bores 22 and 24 which terminate at upper and lower faces of the mounting bracket in the enlarged recessed portions 26 and 28. The steering idler arm is illustrated by the reference character 30 and will be seen to include a boss portion 32 having a bore 34 therethrough which receives a pivot pin member 36, the pivot pin being rigidly affixed to the idler arm boss by means of a lock pin member 38 such that the pivot pin 36 turns with the idler arm and is prevented from longitudinal displacement with respect thereto.

The bores 22 and 24 of the knuckle portions 18 and 20 have bushing members 40 and 42 pressed thereinto for journaling opposite ends of the pivot pin 36 and, as is conventionally provided, an expansion plug member 44 is placed in the upper recess 26 and frictionally engaged therein to prevent the entry of dust into the assembly. Conventionally, or as provided by the manufacturer, the pivot pin 36 is a solid member and a further expansion plug, identical to the plug 44, is provided in the lower recess 28 to seal the lower end of the assembly. Further, combined spacing and thrust washer members 46 and 48 are placed between the upper and lower sides of the idler arm boss 32 and the knuckle portions 18 and 20 to limit end play between the idler arm 30 and its support bracket 14 to within specified limitations.

As has been previously mentioned, the conventional assembly very rapidly develops end play between the idler 30 and the bracket 14 by virtue of undue wear on the bushing members 40 and 42, as well as on the thrust or spacer washers 46 and 48. To correct this defect, the original pivot pin member is removed and discarded, as are the original bushing members 40 and 42 and the replacement kit which forms this invention is substituted in lieu thereof. For the purpose of clarity, it is to be understood that the replacement kit forming this invention consists of a special pivot pin member 36 constructed in accordance with the showing of Figure 1 of the drawings, a single new expansion plug 44, new bushing members 40 and 42, new spacing washer members 46 and 48 and certain other elements associated with the lower end of the pivot pin 36 hereinafter described.

The pivot pin 36 differs from the conventional provided pivot pin in two respects, namely, the provision of a threaded longitudinal bore 50 in the lower end thereof and in a certain shortening of its over-all length which does not permit the pivot pin, when installed, to extend to a point flush with the lower end of the bushing 42 but in slightly spaced relation thereto for a purpose which will be presently apparent.

The lower expansion plug is replaced by the elements which are most clearly illustrated in Figure 3 and which consists of an annular sealing member or spring retainer 52, a resilient thrust member 54, a washer member 56 and a bolt member 58.

The washer 56 is provided with an apertured central hub portion 60 having an end face 62 which, when assembled and under the action of bolt 58, is adapted to engage the lower end of the pin 36. The washer also includes an annular shoulder or flange portion 64 which, when assembled, is disposed in slightly spaced relation to the lower end of the pivot pin 36 and which is received in the recess 28 in the lower end of the knuckle portion 20 of the bracket 14 with slight peripheral clearance therebetween. The resilient member 54 consists of a spirally wound spring wire which has a central loop which snugly engages the hub portion 60 of the washer member 56 and is of conical, cup-shaped or dished configuration such that its loops or spirals do not lie in a common plane.

The outer loop or periphery of the spring member 54 is received within the recess 28 in the lower end of the knuckle portion 20 when the spring is in its uncompressed or natural state, as shown in Figure 3, but which bears radially against the surface defining the recess 28 when the spring is deformed from its natural state such that all its loops lie in substantially a common plane when the bolt member 58 is tightened in the manner shown in Figure 1. The even radial pressure exerted by the spring member 54 always tends to centralize the lower end of the pivot pin 36 properly with respect to the bore 24 in the knuckle portion 20 and prevents undue wear on the bushing member 42 to prevent play between the bushing and the pin. Also, since the shoulder 64 of the washer 56 is of substantially the same diameter as the recess 28 and engages the spring member 54, the assemblage is much less prone to undue end play between the idler arm 30 and the bracket 14 by movement of the pivot pin 36 in a longitudinal direction. In this respect, however, it is to be noted that the diameter of the wire forming the spring 54 is somewhat less than the spacing between the washer shoulder 64 and the knuckle portion 20 such as to normally prevent undue friction and allow the spring member to be uniformly stressed throughout its entirety and impart the proper radial pressure against the surface defining the recess 28. As was previously mentioned, the pin 36 is slightly shorter than the standard pin member, and it will be manifest that this provision is made such as to prevent any frictional contact between the lower end of the pin 36 and the spring member 54 which might otherwise occur if the pin 36 were longer.

Referring now more particularly to Figures 4–6, the constructions shown therein are identical in all respects to the construction described in connection with Figures 1–3, with the exception of the configuration of the spring member, the washer member and the bolt. For example, in Figure 5, the spring member is indicated generally by the reference character 66 and will be seen to consist of a dished or conical annular member having a solid central portion 68 and having a plurality of radially extending notches 70 extending inwardly from its periphery towards the central portion 68 such as to permit the spring member, when deformed as assembled, to expand against the surface defining the recess 28 and impart radial thrust thereto. Also, as is shown in Figure 5, the bolt 72 is itself provided with a hub portion 74 which is snugly engaged by the central portion 68 of the spring member, and the washer member 76 is of flat annular configuration which seats upon the head of the bolt 72 in surrounding relation to the hub 74 thereof, as will be illustrated most clearly in Figure 4. Of course, a washer member, such as that previously described and illustrated by the reference character 56 could be utilized in conjunction with the spring member 66.

Referring now more particularly to Figure 6, the sole distinction between this figure and the assemblage shown in Figure 5 resides in the construction of the spring member 78 which will be seen to consist of a dished member having a solid central portion 80 snugly received on the bolt hub 74 and a plurality of radially disposed ears or finger portions 82 which are deformed out of the plane of the central portion 80 and which are adapted, when the unit is assembled, to bear against the surface defining the recess 28 for imparting the necessary radial stabilizing thrust for properly locating the pin member 36. In all other respects, the operation of the assemblages shown in Figures 5 and 6 and generically illustrated in Figure 4 are identical to the operation of the device shown and described in connection with Figures 1–3.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination with a center steering bracket having spaced knuckle portions provided with registered bores, and a pin journaled in said bores and carrying, between said knuckle portions, a steering arm; a washer rigidly secured to said pin and including an annular shoulder disposed in spaced relation to one end thereof, a conical resilient member disposed between said washer and the one end of the pin and flattened from its normal conical state thereby, said resilient member bearing radially throughout a peripheral portion thereof against the surface of the bore in one knuckle portion.

2. A replacement assembly for the normal center steering arm to bracket attachment, comprising an elongated pin having a smooth exterior surface of uniform diameter and a threaded recess extending longitudinally in one end thereof, a washer, said washer having a central hub portion and an annular shoulder extending radially therefrom, a bolt projecting through said washer and engaged within the recess in said pin whereby the end face of said hub abuts said pin with said annular shoulder in spaced relation thereto, and a conical resilient member disposed between said shoulder and said pin, a spring retainer adapted to bear against said bracket, said resilient member abutting against said spring retainer.

3. A replacement assembly for the normal center steering arm to bracket attachment, comprising an elongated pin having a smooth exterior surface of uniform diameter and a threaded recess extending longitudinally in one end thereof, a washer, said washer having a central hub portion and an annular shoulder extending radially therefrom, a bolt projecting through said washer and engaged within the recess in said pin whereby the end face of said hub abuts said pin with said annular shoulder in spaced relation thereto, and a conical resilient member having a central aperture snugly receiving said hub portion, the resilient member being disposed between said annular shoulder and said pin, a spring retainer adapted to bear against said bracket, said resilient member abutting against said spring retainer.

4. A replacement assembly for the normal center steering arm to bracket attachment, comprising an elongated pin having a smooth exterior surface of uniform diameter and a threaded recess extending longitudinally in one end thereof, a washer, said washer having a central hub portion and an annular shoulder extending radially therefrom, a bolt projecting through said washer and engaged within the recess in said pin whereby the end face of said hub abuts said pin with said annular shoulder in spaced relation thereto, and a radial thrust member disposed between said annular shoulder and said pin, said thrust member comprising a spirally wound spring of conical configuration, said spring including a central loop snugly receiving said hub portion of the washer.

5. A replacement assembly for the normal center steering arm to bracket attachment, comprising an elongated pin having a smooth exterior surface of uniform diameter and a threaded recess extending longitudinally in one end thereof, a washer, said washer having a central hub portion and an annular shoulder extending radially therefrom, a bolt projecting through said washer and engaged within the recess in said pin whereby the end face of said hub abuts said pin with said annular shoulder in spaced relation thereto, and a radial thrust member disposed between said annular shoulder and said pin, said thrust member comprising a dished annular spring member, said spring member having its central portion apertured for snugly receiving said hub portion of the washer and being provided with a plurality of radial slots extending inwardly from its outer edge, a spring retainer adapted to bear against said bracket, said spring member abutting said spring retainer.

6. A replacement assembly for the normal center steering arm to bracket attachment, comprising an elongated pin having a smooth exterior surface of uniform diameter and a threaded recess extending longitudinally in one end thereof, a washer, said washer having a central hub portion and an annular shoulder extending radially therefrom, a bolt projecting through said washer and engaged within the recess in said pin whereby the end face of said hub abuts said pin with said annular shoulder in spaced relation thereto, and a radial thrust member disposed between said annular shoulder and said pin, said thrust member comprising a resilient spring member having an apertured central portion snugly receiving the hub portion of said washer, and including a plurality of ears projecting radially from said central portion and deformed outwardly of the plane thereof.

7. A center steering bracket assembly having a bore, a pin axially slidably and rotationally journaled therein, a member carried by the end of said pin and extending outwardly of the bore, a spring surrounding said member and at one end bearing against the latter, said spring being received within said bore, means associated with the other end of the spring for transmitting its thrust to the wall of the bore.

8. A center steering bracket assembly having a bore, a pin axially slidably and rotationally journaled therein, a member carried by the end of said pin and extending outwardly of the bore, a spring surrounding said member and at one end bearing against the latter, said spring being received within said bore, a spring retainer adapted to be seated in said bore, said spring engaging said retainer.

9. A center steering bracket assembly having a bore, a pin axially slidably and rotationally journaled therein, a member carried by the end of said pin and extending outwardly of the bore, a spring surrounding said member and at one end bearing against the latter, said spring being received within said bore, means associated with the other end of the spring for transmitting its thrust to the wall of the bore, said spring having a perimeter engaging and radially pressing against the wall of the bore.

10. A center steering bracket assembly having a bore, a pin axially slidably and rotationally journaled therein, a member carried by the end of said pin and extending outwardly of the bore, a spring surrounding said member and at one end bearing against the latter, said spring being received within said bore, a spring retainer adapted to be seated in said bore, said spring engaging said retainer, said spring having a perimeter engaging and radially pressing against the wall of the bore.

11. A center steering bracket assembly having a bore, a pin axially slidably and rotationally journaled therein, a member carried by the end of said pin and extending outwardly of the bore, a spring surrounding said member and at one end bearing against the latter, said spring being received within said bore, means associated with the other end of the spring for transmitting its thrust to the wall of the bore, a washer for said member and received in said bore, said one end of said spring abutting said washer.

12. A center steering bracket assembly having a bore, a pin axially slidably and rotationally journaled therein, a member carried by the end of said pin and extending outwardly of the bore, a spring surrounding said member and at one end bearing against the latter, said spring being received within said bore, means associated with the other end of the spring for transmitting its thrust to the wall of the bore, said spring having a perimeter engaging and radially pressing against the wall of the bore, a washer on said member and received in said bore, said one end of said spring abutting said washer.

References Cited in the file of this patent

UNITED STATES PATENTS

| | | |
|---|---|---|
| Re. 20,790 | Bowers | July 12, 1938 |
| 672,932 | Beek | Apr. 30, 1901 |
| 1,339,418 | Poehland | May 11, 1920 |
| 1,414,737 | Gulick | May 2, 1922 |
| 2,620,202 | Coleman | Dec. 2, 1952 |
| 2,621,950 | Ricks | Dec. 16, 1952 |

FOREIGN PATENTS

| | | |
|---|---|---|
| 7,456 | Great Britain | Apr. 8, 1905 |
| 342,700 | Germany | Oct. 22, 1921 |
| 102,041 | Austria | Dec. 10, 1925 |
| 212,902 | Switzerland | Apr. 1, 1941 |
| 564,054 | Great Britain | Sept. 11, 1944 |